no. 112,476

T. Measey, patented March 7, 1871
no. 112,476.

DIV. 3

The crude liquor is introduced into chamber, j, by pipe, u, thence to stills, A and B. The depth of immersion of u, regulates cooling effect on column. The vapor from A passes by hooked tubes, to B. Vapors are purified by passing through pebbles etc. in a. The vapors rotate the vane, f, whereby "globules are broken".

vane wheel vanes g f prevents heavy impurities chamber, i, prevents condensing column being unduly cooled.

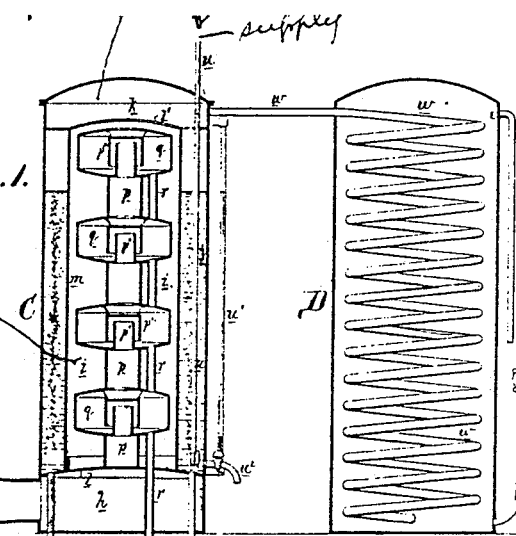

FIG.1.

FIG.3.

pebbles, etc. on a.

d' inwardly opening vacuum valve pumice, gauze, pebbles, etc.

pepples, pumice, etc.

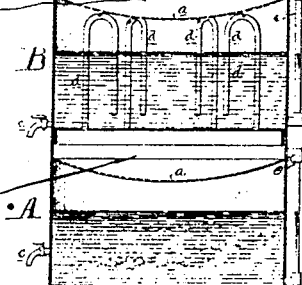

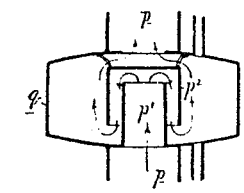

FIG.4.

note, hooked tubes, d, perforated at bend to prevent siphonage.

FIG.2.

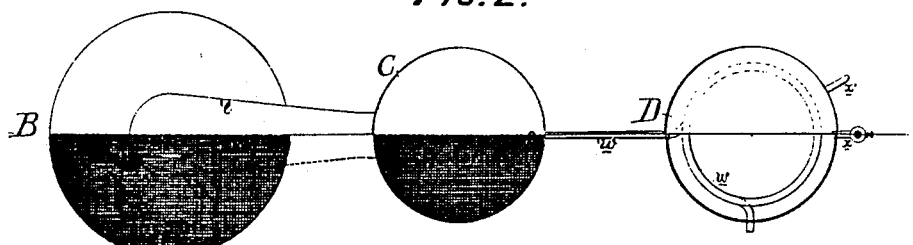

— ION CONDUCTING AIR JACKET AROUND COLUMN, r.
d from ENTERING "BEER" to condenser.

WITNESSES

UNITED STATES PATENT OFFICE.

FREDERICK MEASEY, OF PHILADELPHIA, PENNSYLVANIA, ASSIGNOR TO HIMSELF AND HENRY D. FLING, OF SAME PLACE.

IMPROVEMENT IN APPARATUS FOR RECTIFYING AND REFINING SPIRITS.

Specification forming part of Letters Patent No. 112,476, dated March 7, 1871.

I, FREDERICK MEASEY, of Philadelphia, county of Philadelphia, State of Pennsylvania, have invented an Improved Rectifying and Refining Apparatus, of which the following is a specification:

Nature and Objects of the Invention.

My invention consists of certain improvements, too fully described hereafter to need preliminary explanation, in rectifying and refining apparatus or stills; the improvements being such that a greater quantity of liquor can be run through and purified in a given time, and with much less expenditure of fuel, than with any of the rectifying-stills in use.

Description of the Accompanying Drawing.

Figure 1 is a vertical section of my improved rectifying and refining apparatus; Fig. 2, a plan view of the same, partly in section; Fig. 3, a sectional plan view of part of the apparatus on the line 1 2, Fig. 2; and Fig. 4, an enlarged view of another portion of the apparatus.

General Description.

A and B represent two vessels or stills of any appropriate shape, the vessel B being situated directly above or resting upon the top of the vessel A. Each of the said vessels has near the top a perforated or gauze partition, $a$, the space above which is filled, or nearly filled, with pumice-stone, fine pebbles, or other porous or granular material, for a purpose described hereafter, and the said vessels are also provided with gages $b$, to indicate the height of the liquor within the same, and with drawing-off cocks $c$.

The vessel A communicates with the interior of the vessel B through the bottom of the latter by means of return-pipes $d$, which are contained entirely within the vessel B, extending upward to within a short distance of the gauze partition $a$, and being bent downward, as shown in Fig. 1, so as to terminate close to the bottom of the said vessel.

The uppermost vessel, B, is furnished at the top with a vacuum-valve, $d'$, of ordinary construction, through which air can be admitted in case of a partial vacuum being formed in either of the vessels.

At the top of the vessel B there is a tapering pipe or goose-neck, $e$, within which is arranged a flutter-wheel, $f$, the vanes of which are set at such an angle as to cause it to be rapidly revolved by the ascending vapors, as will be hereafter described.

The end of the goose-neck is connected to and communicates with the lower portion of a vessel, C, which is divided into chambers or compartments $h$, $i$, $j$, and $k$ by solid partitions $l$ and $m$, and by a perforated or gauze partition, $l'$, the space or chamber $k$ above the latter being filled with pumice-stone or other porous or granular material, as before described in reference to the stills A and B.

Within the central portion or chamber, $i$, of the vessel C is contained a device for separating fusel-oil and other impurities from the vapors. This consists of a vertical tube, $p$, communicating at the bottom with the chamber $h$ of the vessel, and expanding or being enlarged at intervals into boxes $q$, a reduced portion, $p^1$, of the tube projecting upward into each of these boxes, and being covered by a cap, $p^2$, so that the vapors, in rising through the tube and boxes, are compelled to take the devious course indicated by the arrows in Fig. 4.

The uppermost box, $q$, has an opening in the top, through which and through the gauze partition $d'$ the vapors may pass into the chamber $k$, and all of the said boxes are connected together by a small pipe, $r$, which passes downward through and is perforated within the chamber $h$, and is connected at its lower end to a pipe, $s$, which forms a communication between the annular chamber $j$ of the vessel C and the lowermost still, A.

Both of the pipes $r$ and $s$ have regulating-cocks $t$, as has also a pipe, $s'$, which connects the annular chamber $j$ with the uppermost still, B.

A supply-pipe, $u$, enters the top of the vessel C, and extends downward into and nearly to the bottom of the annular chamber $j$, and the latter has also an indicating-gage, $u^1$, and a draw-off cock, $u^2$.

The upper or pumice-stone chamber, $k$, of the vessel C communicates directly with a worm, $w$, arranged within a condensing-vessel, D, which is constantly supplied with cold water by means of pipes $x$ and $x'$.

Operation.

In charging the still, the crude spirit to be rectified or refined is first introduced into the annular chamber $j$ of the vessel C through the supply-pipe $u$, and passes from the said chamber through the pipes $s$ and $s'$ into the stills A and B, the latter being about half filled, when the supply is cut off by means of the cocks $t\ t$, and the liquor is maintained at about the level indicated in Fig. 1 in the annular chamber $j$.

The still A is placed directly over a furnace, or may be heated by means of steam-pipes, and the uppermost still, B, receives its heat from the still A.

The vapors which rise from the liquor in the still A pass through the gauze partition $a$ of the latter, and through the mass of pumice-stone above, by which they are deprived of a portion of their impurities. From the pumice-stone the vapors pass into and through the return-pipes $d$ of the still B, and bubble upward through the body of liquor contained in the latter, the liquor being thus heated, and serving at the same time to wash the vapors.

The return-pipes $d$ have small perforations at the top or bend, to prevent them from acting as siphons and discharging the liquor from the upper still into the lower still, A. The apparatus would be defective and uncertain in its operation without this arrangement, which is an important feature of my invention.

The temperature of the liquor in the still B is also raised by the heat radiating from the still A, as the top plate of the latter forms the bottom of the said still B. The liquor in the still B will therefore be vaporized also, and the combined vapors from both stills will rise through the gauze partition and mass of pumice-stone contained in the said still B, and will thus be thoroughly mixed and partially purified.

The mixed vapors, in passing through the wheel $f$ in the goose-neck $e$, will rapidly rotate the same, and the vanes of the said wheel will thoroughly beat the vapors, and, by bursting the globules which rise with the same, will prevent the passage of any considerable quantity of fusel-oil or other heavy impurities into the vessel C. Such heavy impurities, when separated from the vapors by the flutter-wheel, will pass back again into the still B. From the goose-neck $e$ the vapors pass into the chamber $h$ of the vessel C, and then rise through the pipe $p$ and its boxes $q$, taking the devious course before referred to in passing through the latter.

It will be observed that the pipe $p$ and its boxes are not in direct contact with the cold liquor contained in the chamber $j$, but are separated from the same by the chamber $i$. This prevents any considerable amount of condensation in the said pipe and boxes. The vapors are, however, sufficiently cooled to condense the small quantity of fusel-oil and other heavy impurities which may still remain in the same. This condensed liquid from the boxes $q$ is suffered, at the proper intervals, to flow downward through the pipes $r$ and $s$ into the still A, whence it is drawn off with the residuum from the said still through the cock $c$.

The degree of condensation in the tube $p$ and boxes $q$ may be regulated by raising or lowering the height of the cooling-liquor in the chamber $j$. This is also an important feature of my invention, as the amount of condensation required varies with the different liquors which can be treated by the apparatus.

The vapors which rise from the uppermost box, $q$, and pass into the chamber $k$ of the vessel C are thoroughly purified by passing through the pumice-stone in the said chamber, and are finally condensed by passing through the worm $w$ in the condenser D, the result being a pure spirit of high proof.

The cold liquor which is introduced into the annular chamber $j$ for the purpose of slightly cooling the vapors becomes itself slightly heated, in which state it is introduced into the stills A and B.

It should be understood that the above operation is not continuous. About fifteen minutes are required to exhaust the spirit from the liquor contained in both stills A and B, the residuum—consisting of water, fusel-oil, and other impurities—being drawn off from the stills simultaneously through the cocks $c$, and the stills being recharged, as before described, through the pipes $s$ and $s'$ from the chamber $j$.

The fusel-oil and other impurities in the pipe $r$ are suffered to pass into the still A through the pipe $s$ after the spirit has been exhausted from the liquor in the said still, and just before the residuum is drawn off from the same.

I have ascertained, by repeated tests, that a still constructed and operating as above described is more economical of heat, and will run through and purify a greater quantity of liquor in a given time, than any of the stills in common use.

Claims.

1. The combination of the stills A and B, arranged one above the other, and communicating by means of return-pipes $d$, substantially as described.
2. In combination with the above, the gauze partitions $a$, and masses of pumice-stone, or other equivalent material, above the same, in each of the said stills.
3. The return-pipes $d$, when perforated at or near the top or bend to prevent them from siphoning, as described.
4. The arrangement, in a still, of a flutter wheel or wheels, $f$, for the purpose specified.
5. The tube $p$, its enlargement or boxes $q$, the short pipes $p^1$, and caps $q^2$, and the connecting-pipe r, when the whole are arranged within a vessel through which a cooling-liquor is caused to pass.

6. The arrangement of the above in a chamber, i, surrounded by a chamber, j, containing cooling-liquor, and surmounted by a chamber, k, containing a mass of pumice-stone or equivalent material, all substantially as specified.

7. The combination of the vessel C with the stills A and B, when arranged to communicate with the latter by separate pipes s and s'.

8. The combination and arrangement of the stills A and B, vessel C, and condenser D, the whole being constructed, connected together, and arranged for joint operation substantially as herein described.

In testimony whereof I have signed my name to this specification in the presence of two subscribing witnesses.

FREDK. MEASEY.

Witnesses:
 WM. A. STEEL,
 HARRY SMITH.